(12) United States Patent
Friedmann

(10) Patent No.: US 6,299,559 B1
(45) Date of Patent: Oct. 9, 2001

(54) TRANSMISSION CHAIN

(75) Inventor: Oswald Friedmann, Lichtenau-Ulm (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/364,483

(22) Filed: Jul. 30, 1999

(30) Foreign Application Priority Data

Jul. 30, 1998 (DE) .............................................. 198 34 339

(51) Int. Cl.⁷ .............................. F16G 1/22; F16G 13/04
(52) U.S. Cl. ........................... 474/242; 213/245; 213/229
(58) Field of Search .................................. 474/209–213, 474/225–231, 240–245

(56) References Cited

U.S. PATENT DOCUMENTS

| | | | |
|---|---|---|---|
| 1,134,010 | * 3/1915 | Renold | 474/213 |
| 4,272,952 | * 6/1981 | Graham | 474/201 X |
| 4,344,761 | 8/1982 | Steuer . | |
| 4,545,779 | * 10/1985 | Sakakibara et al. | 474/201 X |
| 4,547,182 | 10/1985 | Rattunde . | |
| 4,581,001 | 4/1986 | Rattunde et al. . | |
| 4,631,042 | 12/1986 | Rattunde . | |
| 4,655,733 | * 4/1987 | Jonason | 474/242 |
| 4,710,154 | 12/1987 | Rattunde . | |
| 4,898,568 | * 2/1990 | Sakakibara et al. | 474/245 |
| 4,927,404 | 5/1990 | Rattunde . | |
| 5,046,991 | 9/1991 | Friedmann . | |
| 5,217,412 | 6/1993 | Indlekofer et al. . | |
| 5,295,915 | 3/1994 | Friedmann . | |
| 5,427,583 | 6/1995 | Wolf . | |
| 5,728,021 | 3/1998 | van Rooij et al. . | |

FOREIGN PATENT DOCUMENTS

| | | | |
|---|---|---|---|
| 4415838 | * | 8/1995 | (DE) . |
| 110045 | * | 5/1987 | (JP) . |

* cited by examiner

Primary Examiner—David A. Bucci
Assistant Examiner—Marcus Charles
(74) Attorney, Agent, or Firm—Darby & Darby

(57) ABSTRACT

An endless chain for the transmission of torque between adjustable pulleys of a continuously variable transmission has a series of successive composite links. The neighboring links of the series have overlapping portions with registering openings for composite rocker elements each having two bolts carrying projections at the sides of the chain to abut the adjacent links and/or to oppose unintentional separation of the bolts from the respective links. At least one of the bolts carries a single projection; for example, each bolt can carry a single projection and the projections of the bolts constituting a rocker element can be located at opposite sides or at the same side of the chain. The projections can be of one piece with or can be affixed to the respective bolts. The bolts can be inserted into the respective openings at the one or the other side of the chain. A band can be provided to hold the parts of the chain in assembled condition, for example, during transport of the chain to the locale of training over the pulleys of a transmission.

23 Claims, 3 Drawing Sheets

TRANSMISSION CHAIN

BACKGROUND OF THE INVENTION

The present invention relates to motion transmitting devices in general, and more particularly to improvements in elongated flexible motion transmitting devices (hereinafter called chains for short). Still more particularly, the invention relates to improvements in chains (such as endless link chains) which can be utilized with advantage to transmit torque between pulleys or sheaves, such as adjustable pulleys forming part of continuously variable (CVT) and analogous transmissions. The invention also relates to improvements in methods of making link chains as well as to transmissions which employ the improved chains.

Chains of the character to which the present invention pertains are disclosed, for example, in German patents Nos. 44 15 838 and 35 26 062. The patented chains comprise longitudinally extending links which are articulately connected to each other by transversely extending pintles or bolts (also called rocker elements). The end portions of the bolts extend to or beyond the lateral sides of the assembled chain and are provided with abutments serving to prevent accidental dismantling of the assembled chain and/or as a means for contacting the flanges of pulleys in the transmissions in which the patented chains are put to use, i.e., at those locations where the bolts and the neighboring links are most likely to become partially or fully separated from each other. As a rule, each bolt carries an abutment at each of its ends, i.e., at both lateral sides of the assembled chain. Reliable retention of all constituents of a link chain in fully assembled condition is highly desirable because the disengagement of one or more links from the neghboring bolts reduces the effectiveness of the chain and can entail total destruction of the chain, a malfunctioning or a complete breakdown of the transmission, e.g., failure of the transmission to transmit torque between the driving and driven pulleys one of which receives torque from a prime mover and the other of which transmits torque (directly or indirectly) to the driven axles in the power train of a motor vehicle. This can result in injuries or inconvenience to the occupant(s) of the motor vehicles, for example, if a breakdown takes place at a location which is remote from a service station.

On the other hand, the provision of plural abutments of adequate sturdiness, size and shape on each bolt of a link chain contributes significantly to the cost of conventional link chains, not only because of the expenses involved in connection with the making of the chain but also as concerns the cost of the materials which are required for the making of the abutments and/or for attachment of separately produced abutments to the end portions of the respective bolts.

OBJECTS OF THE INVENTION

An object of the invention is to provide a novel and improved link chain which is just as reliable as but less expensive than heretofore known chains.

Another object of the invention is to provide a link chain which can be utilized as an equivalent of or superior substitute for conventional chains.

A further object of the invention is to provide a novel and improved method of making and assembling a link chain for use in transmissions, particularly in continuously variable transmissions, or for analogous purposes.

An additional object of the invention is to provide the above outlined link chain with novel and improved means for maintaining the constituents of the improved chain in fully assembled condition during storage and/or during transport to the locale of actual use.

Still another object of the invention is to provide a transmission, particularly a continuously variable transmission, which employs the above outlined link chain.

A further object of the invention is to provide a novel and improved combination of links (particularly so-called side bar links), bolts and abutments which together constitute or form part of the improved link chain.

Another object of the invention is to provide a novel and improved distribution of abutments and novel and improved combinations of bolts with abutments for use in the above outlined link chain.

An additional object of the invention is to provide a link chain wherein the overall number of discrete parts is a fraction of the overall number of parts in a conventional link chain for use in a continuously variable transmission, particularly a transmission which is installed in the power train of a motor vehicle to transmit torque from the prime mover (such as an internal combustion engine) to the live axle or axles of the motor vehicle.

Still another object of the invention is to provide a power train for use in motor vehicles which employs one or more link chains embodying the present invention.

A further object of the invention is to provide the bolts of a link chain with abutments which are configurated, applied to the respective bolts and oriented relative to the lateral sides and/or relative to the inner and/or outer sides of an endless chain with a view to save considerable amounts of material as well as manufacturing and/or assembly costs.

An additional object of the invention is to provide novel and improved methods of equipping the bolts of the above outlined link chain with abutments which, though fewer than in conventional link chains, can withstand the stresses arising when the improved link chain is put to use in a continuously variable transmission or the like.

SUMMARY OF THE INVENTION

One feature of the instant invention resides in the provision of an elongated chain which comprises a series of neighboring links extending longitudinally of the chain nd having overlapping portions provided with at least partially registering openings, and elongated rocker elements (each of which can comprise or consist of two parallel neighboring bolts) extending through the at least partially registering openings transversely of the chain to articulately (particularly pivotably) connect the respective neighboring links to each other.

The links of the aforementioned series are or can be arranged to be trained over a plurality of adjustable pulleys or sheaves in a continuously variable transmission (CVT) wherein each of the pulleys comprises a plurality of coaxial flanges at least one of which is adjustable axially of each other flange of the respective pulley or sheave.

Each of the rocker elements has a first and a second end portion at the respective (first or second) lateral side of the chain, and the improved link chain preferably further comprises projections provided on selected end portions of the rocker elements. The total number of the end portions exceeds the total number of the projections, i.e., at least one end portion is devoid of a projection.

The projections are or can be configurated, positioned and/or dimensioned to oppose separation of the rocker elements and the respective links from each other and/or to abut at least one link of the respective neighboring links.

The arrangement can be such that each rocker element carries a single projection.

The rocker elements together form a series of successive rocker elements (as seen in the longitudinal direction of the chain), and the projections can form first and second rows at the respective (first and second) lateral sides of the chain. The projections of the first row can alternate with the projections of the second row, as seen in the longitudinal direction of the chain.

If each rocker element comprises a pair of elongated bolts, each bolt of at least one pair of bolts can carry a single projection; such single projections can be adjacent each other at one lateral side of the chain. At least some of the projections can be carried by the outer and/or at the inner sides of the respective rocker elements.

One or more projections can constitute abutments which are of one piece with the respective rocker elements. Such projection(s) or abutment(s) can constitute shaped portion(s) of the respective rocker element(s).

At least one of the projections or abutments can be affixed to the respective rocker element, e.g., by bonding (such as welding). In lieu of relying on a bonding procedure, at least one of the projections or abutments can be mechanically affixed to the respective rocker element or to one bolt of the respective rocker element.

At least one of the projections can be provided on the respective rocker element prior or after introduction of such rocker element into the openings of the respective neighboring links.

The link chain can further comprise confining means which serves to maintain the links and the rocker elements in an assembled condition in which the rocker elements extend into the openings of the respective neighboring links. The confining means can comprise at least one band which is adjacent the outer sides or the inner sides of the links. Furthermore, the confining means can comprise at least one composite band, e.g., a slotted band. Still further, the confining means can comprise at least one endless band.

Each of the links can comprise a plurality of substantially plate-like side bars extending in the longitudinal direction of the chain.

The novel features which are considered as characteristic of the invention are set forth in particular in the appended claims. The improved link chain itself, however, both as to its construction and the modes of assembling and installing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
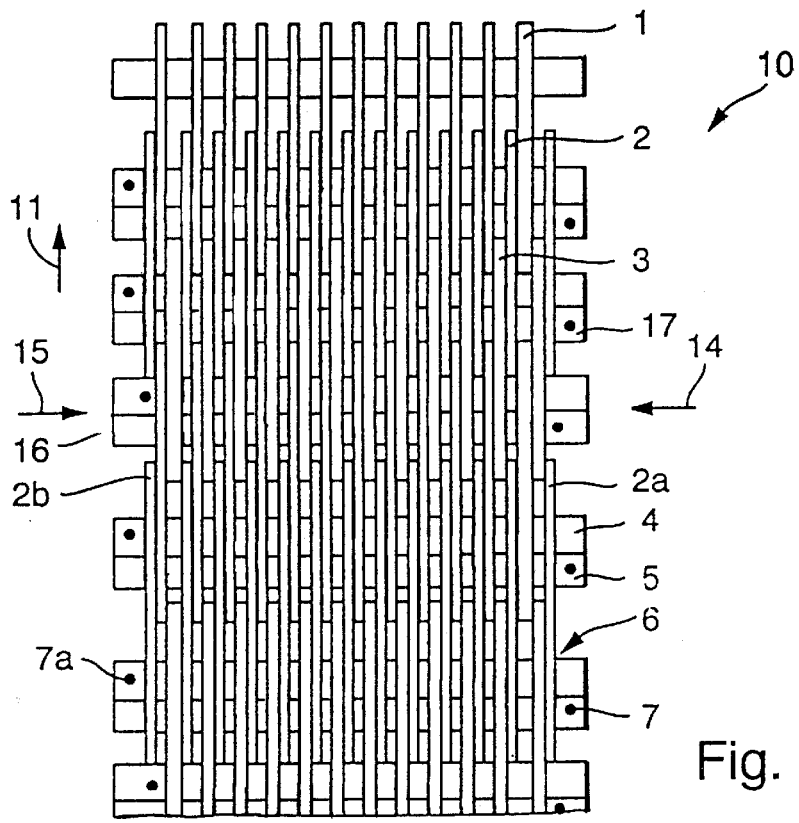
FIG. 1 is a schematic fragmentary plan view of a link chain which embodies one form of the invention.
Figure 6:
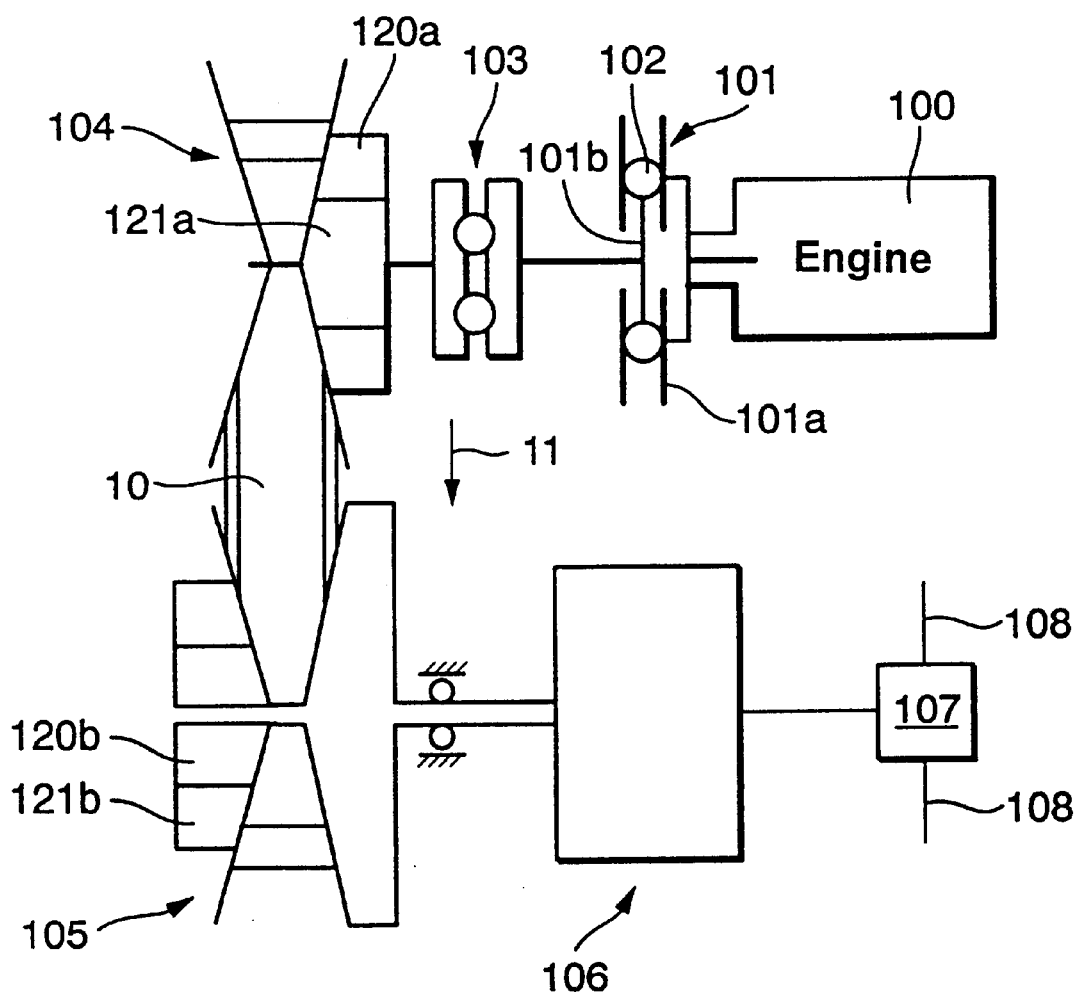
FIG. 6 is a schematic elevational view of a continuously variable transmission employing an endless link chain which can embody the present invention.

FIG. 1 shows a portion of an elongated link chain 10 which, when put to use (e.g., in a manner as shown in FIG. 6), is caused to advance lengthwise in the direction indicated by arrow 11. The chain 10 comprises several transversely extending rows of composite links each including three parallel plate-like side bars 1, 2, 3. In FIG. 1, each row comprises a rather substantial number (such as seven or eight) of links. The links of neighboring transversely extending rows partially overlap each other, and the overlapping portions of neighboring rows of links have openings 6 which at least partially register with each other (as seen at right angles to the direction indicated by the arrow 11) to receive composite rocker elements each including two elongated parallel bolts or pintles 4, 5. Such rocker elements enable neighboring rows of composite links 1–3 to pivot relative to each other about axes extending at right angles to the direction indicated by the arrow 11.

The links of the chain 10 are assembled and distributed in a so-called triple slide bar arrangement; however, it is equally possible to select a different distribution, e.g., a so-called double bar arrangement. Such arrangements are well known and are widely utilized in the fields of torque or force transmitting means for use in various transmissions, e.g., in so-called continuously variable transmissions (CVT) one of which is shown in FIG. 6. The transmission of FIG. 6 is shown as being installed in the power train of a motor vehicle, namely to transmit torque between a prime mover (such as an internal combustion engine 100) and a differential (107) between two live axles (108). The purpose of the transmission is to automatically conform the ratio to the circumstances under which the motor vehicle is being driven or to conform the ratio to the circumstances selected by the operator of the motor vehicle (e.g., to the extent to which the gas pedal is being depressed).

The link chain 10 of FIG. 1 forms part of an endless chain which is trained over several pulleys or sheaves (FIG. 6 shows two adjustable pulleys 104, 105) each of which normally comprises two coaxial flanges having frustoconical or convex annular surfaces contacting the respective lateral surfaces of the chain or the respective end portions of the bolts 4, 5. At least one flange of each pulley is movable axially toward and away from the other flange to thus select the force with which the frustoconical or convex surfaces engage the adjacent lateral surfaces of the endless chain (or the respective end portions of the bolts 4, 5) and/or the ratio of the transmission. In order to change the transmission ratio, that looped portion of the endless chain which is trained over the pulley 104 of FIG. 6 is caused to move radially inwardly nearer to the axis of such pulley while, at the same time, the looped chain portion which is trained over the pulley 105 is caused to move radially outwardly and hence away from the axis of the pulley 105, or vice versa.

Signals to change the ratio of the transmission are transmitted (in a manner not forming part of the present invention) by a suitable control unit including the structure shown schematically (at 106) in FIG. 6. The shaft of the pulley 104 receives torque from the prime mover 100, and the shaft of the pulley 105 transmits torque to the rotary input shaft of the differential 107.

Referring again to FIG. 1, the bolts 4, 5 of each composite rocker element have end portions adjacent the respective lateral sides of the chain 10, i.e., adjacent the respective outermost side bars (see the side bars 2a and 2b). Each bolt 4 can slide and/or roll relative to the respective bolt 5 (and/or vice versa) when the chain 10 is in use and the rocker element including such bolts is compelled to travel along an arcuate portion of its endless path (around the shaft of the pulley 104 or 105). The arrow 11, which indicates the direction of advancement of the link chain 10, is normal to the axes of the pulleys 104, 105.

The end faces of the bolts 4, 5 (see the bolt 4 in FIG. 3 or 4) are or can be configurated to lie flush against the adjacent conical surfaces of the flanges forming part of the pulleys 104, 105.

FIG. 1 shows that, in the chain 10, the side bars 1, 2, 3 and the links consisting of such side bars are distributed in a manner to ensure that the chain exhibits a predetermined pattern of plate-like and elongated bolt-like constituents. In the pattern which is shown in FIG. 1, the rocker elements (composed of pairs of bolts 4, 5) are caused to extend through the openings 6 of pairs of side bars 1, 2 or 2, 3 or 3, 1. However, it will be appreciated that it is equally possible to select any one of a host of different patterns, for example, a pattern wherein the openings 6 are replaced with openings providing room for reception of two pairs of bolts 4, 5, i.e., for composite rocker elements each of which is assembled of more than two bolts. The bolts abut and can (but need not) turn relative to the surfaces bounding the openings 6 (or modified openings) of the respective side bars 1, 2, 3 and/or analogous side bars. If the rocker elements comprise sets of three or more bolts or pintles, the bolts can be arrayed in such a way that two outer bolts contact the internal surfaces bounding the openings 6 of the side bars forming part of the neighboring rows of links, and one or more intermediate bolts (i.e., those between the outer bolts) are maintained out of contact with the surfaces bounding the openings of the respective side bars. All that counts is that, if each rocker element comprises several parallel elongated bolts (such as 4, 5), the bolts can slide and/or roll and/or otherwise move relative to each other to an extent which is required to ensure the necessary flexibility of the link chain.

The bolts 4, 5 are provided with projections or abutments 7, 7a which are adjacent the lateral surfaces of the chain 10 and which can serve to abut the adjacent side bars (such as 2a, 2b) and/or to oppose (and preferably prevent) unintentional separation of rocker elements (4, 5) from the respective pairs of neighboring rows of links. In accordance with an important and advantageous feature of the invention, the overall number of projections 7, 7a is less than the overall number of bolts. In other words, at least one of the bolts 4, 5 is provided with a single projection. This entails substantial savings in manufacturing and assembly costs.

FIG. 1 shows that each of the bolts 4 has a single projection or abutment 7a at its left-hand end (adjacent the left-hand lateral side of the chain 10), and that each of the bolts 5 has a single projection or abutment 7 adjacent the right-hand lateral side of the chain. This reduces the overall number of projections in half (in comparison with conventional link chains wherein each one-piece rocker element has two projections and each two-piece (twin-bolt) rocker element has four projections). FIG. 1 further shows that the projections 7 form a first file or row of longitudinally spaced-apart projections adjacent the right-hand lateral side of the chain 10, that the projections 7a form a second file or row of longitudinally spaced-apart projections adjacent to the left-hand lateral side of the chain 10, and that the projections 7 alternate with the projections 7a as seen in the direction of the arrow 11. More specifically, the projections 7 and 7a can be said to jointly establish a zig-zag formation.

The projections 7 abut or are closely adjacent the outer side bars 2a and thus hold such side bars against movement away from the neighboring side bars; in addition, the projections 7 prevent any tilting or excessive tilting or analogous undesirable changes in orientation of the adjacent side bars 2a relative to the respective neighboring side bars. The same holds true for the projections 7a and the adjacent side bars 2b. Irrespective of their other advantages, the projections 7 and 7a reliably hold the side bars 2a, 2b (and hence also the intermediate side bars 1, 2 and 3) against movement away from each other (as seen transversely of the direction indicated by the arrow 11).

Figure 2:
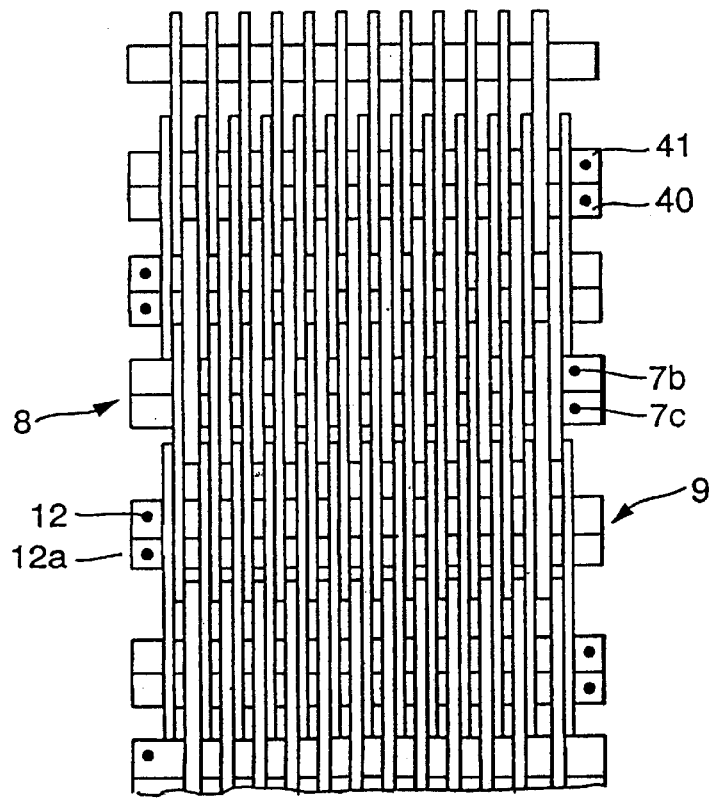
FIG. 2 is a similar fragmentary plan view of a modified link chain.

FIG. 2 shows certain details of a modified link chain with alternating joints 8, 9. Each joint 8 includes a rocker element with two parallel bolts 40, 41 each having a single projection or abutment (7b, 7c) adjacent the right-hand lateral side of the chain, and each joint 9 has two parallel bolts 40, 41 with projections 12, 12a adjacent the left-hand side of the link chain. Thus, pairs of projections 7b, 7c at one lateral side alternate with pairs of projections 12, 12a at the other lateral side of the link chain of FIG. 2. It is equally possible to design the chain of FIG. 2 in such a way that single joints 8 alternate with two or more joints 9 or vice versa, that pairs of joints 8 alternate with pairs of joints 9, and so forth.

An advantage of the chain of FIG. 2 is that all of the projections (7b, 7c, 12, 12a) can be applied to or formed on the respective bolts 40, 41 prior to assembly of pairs (rocker elements) of such bolts with the side bars to jointly constitute the chain. The distribution of the side bars shown in FIG. 2 can but need not be identical with that of the side bars 1, 2, 2a, 2b, 3 in the chain of FIG. 1. The just described advantage is shared by the chain 10; reference may be had again to FIG. 1 wherein the directions of inserting the bolts 4, 5 are respectively indicated by arrows 15, 14. The arrow 15 actually indicates the direction of insertion of a bolt 16 which is or can be one of the bolts 4, and the arrow 14 indicates the direction of insertion of a bolt 17 which is (or can be) one of the bolts 5. It will be seen that the insertion of the bolt 16 (arrow 15) into the respective openings 6 takes place counter to the direction (arrow 14) of insertion of the bolt 17.

Figure 3:
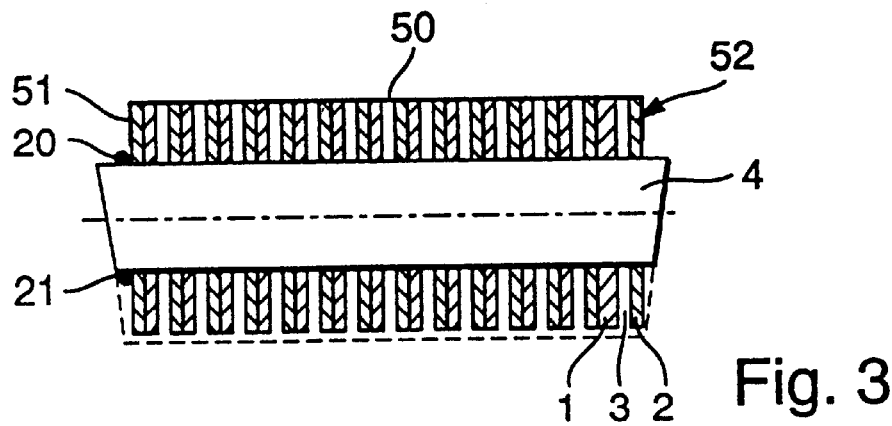
FIG. 3 is a transverse sectional view of a third link chain.

FIG. 3 shows a portion of a link chain wherein each of the bolts (only one of the bolts 4 is actually shown) has an outer side carrying a projection or abutment 20 at the left-hand lateral side of the chain, and an inner side carrying a projection or abutment 21. The projection 20 or 21 can be omitted, and the right-hand end portion of the bolt 4 which is shown in FIG. 3 does not (but can) have a single projection or two projections. If the chain of FIG. 3 is an endless chain, the inner side is that side which confronts the shafts of the pulleys in a continuously variable transmission, and the outer side is the exposed side of such endless chain.

It is also possible to provide one of the projections 20, 21 on the right-hand end portion of the bolt 4 which is shown in FIG. 3; one of these projections can be provided at the inner side and the other projection can be provided at the outer side of the bolt. Alternatively, and if the chain of FIG. 3 employs composite rocker elements, one bolt of each such rocker element can carry a single projection (e.g., the projection 20), and the other bolt can also carry a single projection (e.g., the projection 21), i.e., one projection can be provided at the inner side and the other projection can be provided at the outer side of such chain. It is equally possible to provide the bolts of a composite rocker element with projections (20) at the outer side and to provide the remaining composite rocker elements with projections 21 at the inner side of the respective chain.

As already mentioned hereinbefore, a chain wherein each of the bolts (such as the bolts 4, 5 shown in FIG. 1) has a single projection (7 or 7a), or wherein at least some of the composite rocker elements are equipped with projections in the just described manner, exhibits the important advantage that a fully assembled and installed chain can be dismantled (either entirely or in part, such as detached from the pulleys) without any damage to or without destruction of its component parts. It has been found that the alternating distribution of projections (7, 7a) in a manner as shown in FIG. 1 is particularly satisfactory, i.e., if discrete projections (7) at one lateral side of the chain 10 alternate with discrete projections (7a) at the other lateral side of the chain (as seen in the direction of the arrow 11, namely in the longitudinal direction of the chain). The side bars (or at least the side bars 2a and 2b) are or can be dimensioned in such a way that each of these side bars abuts at least one but preferably at least two neighboring projections 7 or 7a. Such selection of the numbers and such distribution of the projections have been found to reliably ensure that side bars cannot become separated from and/or misaligned relative to the other component parts of the chain. The design which is shown in FIG. 2 has been found to be just as reliable.

It is presently preferred to provide the bolts (4, 5, 16, 17, 40, 41) with projections or abutments (7, 7a, 7b, 7c, 12, 12a 20, 21) prior to insertion of the bolts into the respective openings 6. For example, the projections can be obtained by deforming selected portions of the respective bolts, i.e., the projections can be of one piece with the respective bolts. However, it is equally possible to employ separately produced projections which are thereupon mechanically affixed (e.g., pinned or riveted) or bonded (e.g., welded) to the respective bolts. Laser welding constitutes one of the presently preferred modes of affixing separately produced projections to the respective bolts. Furthermore, it is preferred to (mechanically or otherwise) affix the projections to the respective bolts before the bolts are subjected to the customary thermal treatment for the purpose of hardening and/or to enhance certain other qualities of the joints.

FIG. 3 further shows that the outer side of the chain is provided with a confining means 50 which can constitute a lining or belt or band (hereinafter called band) serving to prevent the chain from falling apart during transport and/or in storage. The band 50 can have marginal portions 51, 52 which overlie the adjacent (outer) parts of the lateral sides of the chain. As indicated by broken lines, the band 50 can be provided at the inner side of the chain, or the chain can be provided with two bands, i.e., one at the inner side and the other at the outer side.

Figure 4:
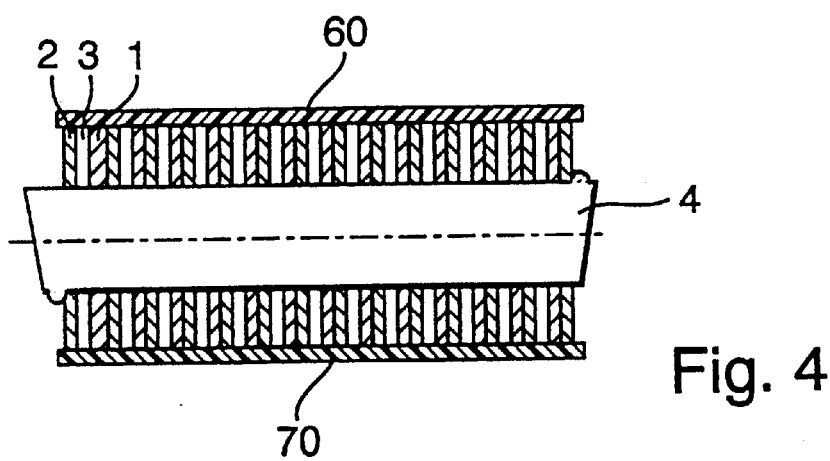
FIG. 4 is a similar transverse sectional view of a fourth link chain.

FIG. 4 shows a portion of a chain which can be identical with or which can differ from the chain of FIG. 3. Actually, the two chains are different because the chain of FIG. 4 has bolts 4 (only one shown) with non-referenced projections at the inner sides of the left-hand end portions and with non-referenced projections at the outer sides of their right-hand end portions. Furthermore, the confining means of the chain which is shown in FIG. 4 comprises a radially outer band 60 and a radially inner band 70.

The band 50, 60 and/or 70 can overlie only the exposed edge faces of the side bars or such exposed edge faces and the sides of the outermost side bars (see the parts 51, 52 of the band 50). Of course, these bands also serve as a means for indirectly shielding or retaining the rocker elements, or certain or all bolts of the rocker elements, e.g., to prevent separation or undesirable shifting of the bolts relative to the respective rows of links and side bars.

The confining means can employ one or more one-piece bands or one or more composite bands. For example, at least one of the bands 50, 60, 70 can consist of several relatively narrow discrete or interconnected strips, or at least one of these bands can be slotted. Still further, at least one of the bands 50, 60, 70 can consist of two or more elongated sections which are disposed end-to-end. Furthermore, the band 50 or 60 can be applied in prestressed (prestretched) condition so that it bears against the outer sides of the links and their side bars to thus further reduce the likelihood or possibility of unintentional disassembly or falling apart of the chain. Thus, at least one of the bands shown in FIGS. 3 and 4 can engage the links and their side bars by friction; furthermore, a prestressed band urges the side bars into frictional engagement with each other and/or with the bolts of the joints between the rows of links.

It is also possible to design and install the novel confining means in a number of additional ways, for example, to exert upon the component parts of the chain a pull for the purpose of generating frictional or mere side-to-side or end-to-end engagement which suffices to prevent or to reduce the likelihood of unintentional dismantling of the chain.

The band or bands of the confining means can be separably or more or less permanently secured to the chain. Thus, the band or bands can be separated at the locale of use of the chain, i.e., immediately prior to training of an endless chain over the pulleys of a transmission. Alternatively, the band (such as the outer band 50 or 60) can remain on the chain while the transmission employing such chain is in actual use. Such band (especially a tensioned band 50 or 60) can serve as a means for preventing or as a means for at least damping vibrations of the chain in actual use of the transmission. Such bands can be made of a flexible (particularly elastomeric and preferably synthetic plastic) material.

The inner band 70 of FIG. 4 can consist of suitable steel sheet or strip stock or of any other suitable elastic metallic sheet material. The strip which is to constitute the band can be slotted in the axial direction of an endless chain (i.e., at least substantially transversely of the direction indicated by the arrow 11) and can be inserted into the endless chain in compressed condition so that it tends to expand and to thus stress the joints between the rows of links forming part of the chain.

The radially outer band 50 or 60 can constitute an expandible hose which tends to contract as soon as it is applied around the chain of FIG. 3 or 4. Moreover, such hose can be subjected to a suitable thermal deforming treatment so that it is compelled to shrink onto the links of the chain.

It is often desirable to shrink and/or to otherwise treat the band 50, 60 and/or 70 (or another band or strip) in such a way that the assembly including the band or bands and a chain exhibits a circular, an oval or a similar shape in order to facilitate storage by reducing the space requirements. This also holds true for the transport of chains to the locale of actual use, e.g., to an automobile assembly plant. Elastomeric and metallic materials are particularly suitable for such purposes.

It is further possible to employ a confining means which is designed to impart to the confined chain a shape at least resembling that of a chain already trained over the pulleys in a transmission, e.g., over pulleys of the type schematically shown in FIG. 6.

Still further, the confining means can be designed to constitute or to form part of an enclosure or wrapper which at least partially encloses a finished chain during storage and/or in transport. The primary purpose of the enclosure is to preserve the integrity of the chain at least prior to mounting in a transmission. Such enclosure can serve to prevent damage to and/or to reduce the likelihood of contamination of the chain.

Figure 5:
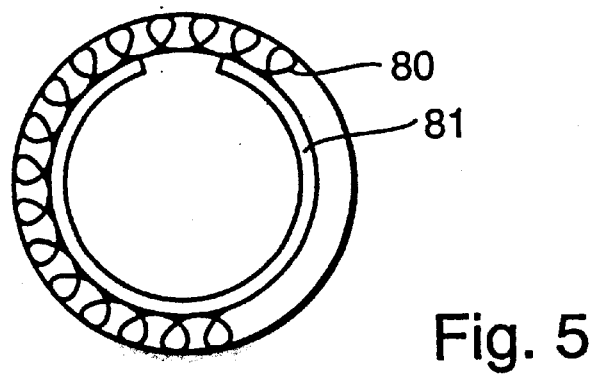
FIG. 5 is a schematic side elevational view of an endless chain which embodies still another form of the invention.

FIG. 5 shows an endless circular or substantially circular chain having an inner side engaged by a confining and protecting band 81, and an outer side surrounded by an endless second confining means 80. The band 81 tends to expand and thus subjects the constituents of the chain to stresses of a first nature (e.g., to tensional and frictional stresses); the confining means 80 can be selected, installed and treated to subject the parts of the chain to compressive and frictional stresses. The two confining means 80, 81 can cooperate to impart to the chain a substantially annular shape.

Referring again to FIG. 6, the prime mover 100 is arranged to drive the input element 101a of a damper 101. The damper further comprises an output element 101b which can rotate relative to the input element 101a against the opposition of coil springs and/or other suitable energy storing elements 102. The damper 101 can be replaced by or utilized jointly with suitable friction generating means, not shown.

The output element 101b of the damper 101 transmits torque to the shaft of the driving pulley 104 of the continuously variable transmission of FIG. 6 by way of a standard torque sensor 103; the latter can constitute a single-stage or a multi-stage torque sensor. A suitable torque sensor is described and shown, for example, in published German patent application Ser. No. 42 34 294.

The axially movable flange of the pulley 104 is adjustable by either of two hydraulic motors 120a, 121a having plenum chambers which can receive or discharge hydraulic fluid in response to signals from the aforementioned control unit. One of the motors 120a, 121a serves to adjust the axially movable flange of the pulley 104 in order to change the ratio of the transmission, and the other of these motors adjusts the force with which the flanges of the pulley 104 engage the adjacent portion of the endless link chain 10, namely, the adjacent end faces of the bolts 4, 5. Each of the motors 120a, 121a can constitute a double-acting cylinder and piston unit.

When the transmission of FIG. 6 is in use, the endless link chain 10 drives the pulley 105 having an axially fixed and an axially adjustable flange; the latter can be moved relative to the axially fixed flange by one of the fluid-operated motors 120b, 121b the functions of which are analogous to those of the motors 120a, 121a. The output shaft of the pulley 105 can drive the input element of the differential 107 by way of the components schematically denoted by the aforementioned block 106. Such components can include a direction reversing unit and/or a starter unit.

Pulleys of the type capable of being put to use in the transmission of FIG. 6 are disclosed, for example, in published German patent applications Ser. Nos. 42 01 692 and 41 34 658.

The apparatus of FIG. 6 can further comprise a direction reversing unit and/or a starter unit (such as a starter clutch or a hydrokinetic torque converter); such unit or units can be installed upstream of the first pulley 104.

The disclosure of the commonly owned German priority patent application Ser. No. 198 34 339.6-12 (filed Jul. 30, 1998) is incorporated herein by reference, the same as each German patent and German patent application (as well as all corresponding United States patents and patent applications) identified in the specification of the present application.

Reference may also be had to U.S. Pat. No. 4,344,761 (Steuer), U.S. Pat. No. 4,547,182 (Rattunde), U.S. Pat. No. 4,581,001 (Rattunde et al.), U.S. Pat. No. 4,631,042 (Rattunde), U.S. Pat. No. 4,710,154 (Rattunde), U.S. Pat. No. 4,927,404 (Rattunde), U.S. Pat. No. 5,427,583 (Wolf) and U.S. Pat. No. 5,728,021 (van Rooij et al.) The disclosures of these United States patents, too, are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art of chains for continuously variable transmissions and the like and, therefore, such adaptations should and are intended to be comprehended within the meaning and range of equivalence of the appended claims.

What is claimed is:

1. An elongated chain having a first lateral side and a second lateral side and comprising:
    a series of neighboring links extending longitudinally of the chain and having overlapping portions provided with at least partially aligned openings;
    elongated rocker elements extending through said at least partially aligned openings transversely of the chain to articulately connect the respective neighboring links to each other, each of the said rocker elements having first and second end portions at the respective lateral sides of the chain; and
    projections provided on selected end portions of said rocker elements, the total number of said end portions exceeding the total number of said projections, wherein each of said rocker elements comprises a pair of elongated bolts and the bolts of each pair are provided with single projections, the projection of one bolt of each pair of bolts being disposed at one lateral side and the projection of the other bolt of each pair of bolts being disposed at the other lateral side of the chain.

2. The chain of claim 1, wherein said projections are configurated, positioned and dimensioned to oppose separation of the rocker elements and the respective links from each other.

3. The chain of claim 1, wherein said projections are configurated, positioned and dimensioned to abut at least one link of the respective neighboring links.

4. The chain of claim 1, wherein each of said rocker elements carries a single projection.

5. The chain of claim 1, wherein said rocker elements together form a series of successive rocker elements as seen in the longitudinal direction of the chain, said projections forming first and second rows at the respective lateral sides of the chain and the projections of said first row alternating with the projections of said second row as seen in the longitudinal direction of the chain.

6. The chain of claim 1, wherein each of said rocker elements has an outer side and an inner side, at least some of said projections being carried by the outer sides of the respective rocker elements.

7. The chain of claim 1, wherein each of said rocker elements has an inner side and an outer side, at least some of said projections being carried by the inner sides of the respective rocker elements.

8. The chain of claim 1, wherein at least one of said projections is of one piece with the respective rocker element.

9. The chain of claim 1, wherein at least one of said projections is affixed to the respective rocker element.

10. The chain of claim 1, wherein at least one of said projections is provided on the respective rocker element prior to introduction of such rocker element into the openings of the respective neighboring links.

11. The chain of claim 1, wherein at least one of said projections is provided on the respective rocker element subsequent to introduction of such rocker element into the openings of the respective neighboring links.

12. The chain of claim 1, further comprising confining means for maintaining said links and said rocker elements in an assembled condition in which said rocker elements extend into the openings of the respective neighboring links.

13. The chain of claim 1, wherein each of said links comprises a plurality of substantially plate-like side bars extending in the longitudinal direction of the chain.

14. The chain of claim 8, wherein said at least one projection constitutes a shaped portion of the respective rocker element.

15. The chain of claim 1, wherein said at least one projection is bonded to the respective rocker element.

16. The chain of claim 9, wherein said at least one projection is mechanically affixed to the respective rocker element.

17. The chain of claim 12, wherein said links have inner and outer sides and said confining means comprises at least one band adjacent the outer sides of said links.

18. The chain of claim 12, wherein said links have inner and outer sides and said confining means comprises at least one band adjacent the inner sides of said links.

19. The chain of claim 12, wherein said confining means comprises at least one composite band.

20. The chain of claim 12, wherein said confining means comprises at least one endless band.

21. The chain of claim 16, wherein said at least one projection is welded to the respective rocker element.

22. The chain of claim 20, wherein said at least one band is slotted.

23. An elongated chain having a first lateral side and a second lateral side and comprising:

a series of neighboring links extending longitudinally of the chain and having overlapping portions provided with at least partially aligned openings;

elongated rocker elements extending through said at least partially aligned openings transversely of the chain to articulately connect the respective neighboring links to each other, each of the said rocker elements having first and second end portions at the respective lateral sides of the chain; and projections provided on selected end portions of said rocker elements, the total number of said end portions exceeding the total number of said projections, wherein each of said rocker elements comprises a pair of elongated bolts and each bolt of at least one of said pairs carries a single projection, said single projections being adjacent each other at one lateral side of the chain.

* * * * *